(12) United States Patent
Johnson

(10) Patent No.: US 8,955,860 B2
(45) Date of Patent: Feb. 17, 2015

(54) VEHICLE SUSPENSION ASSEMBLY WITH INTEGRATED TORQUE MEMBER AND TRAILING ARM MOUNT

(71) Applicant: SAF-Holland, Inc., Holland, MI (US)

(72) Inventor: Marc Johnson, Muskegon, MI (US)

(73) Assignee: SAF-Holland, Inc., Holland, MI (US)

( * ) Notice: Subject to any disclaimer, the term of this patent is extended or adjusted under 35 U.S.C. 154(b) by 8 days.

(21) Appl. No.: 13/839,113

(22) Filed: Mar. 15, 2013

(65) Prior Publication Data

US 2013/0257004 A1  Oct. 3, 2013

Related U.S. Application Data

(60) Provisional application No. 61/616,733, filed on Mar. 28, 2012.

(51) Int. Cl.
| | | |
|---|---|---|
| *B60G 9/02* | (2006.01) | |
| *B60G 9/00* | (2006.01) | |
| *B60G 5/00* | (2006.01) | |
| *B60G 21/055* | (2006.01) | |

(52) U.S. Cl.
CPC  *B60G 9/003* (2013.01); *B60G 5/00* (2013.01); *B60G 9/022* (2013.01); *B60G 21/055* (2013.01); *B60G 2200/315* (2013.01); *B60G 2204/82* (2013.01); *B60G 2204/8302* (2013.01); *B60G 2206/201* (2013.01); *B60G 2206/604* (2013.01)
USPC ......... 280/124.116; 280/124.11; 280/124.166

(58) Field of Classification Search
USPC ....................... 280/124.11, 124.111, 124.106, 280/124.107, 124.128, 124.129, 124.131, 280/124.132, 124.152, 124.156, 124.166
See application file for complete search history.

(56) References Cited

U.S. PATENT DOCUMENTS

| | | | |
|---|---|---|---|
| 2,075,041 A | * | 3/1937 | Kliesrath ........................ 267/274 |
| 2,730,375 A | * | 1/1956 | Porsche et al. .......... 280/124.107 |
| 3,140,880 A | * | 7/1964 | Masser ................... 280/124.108 |
| 3,183,018 A | * | 5/1965 | Holmstrom .................... 280/684 |
| 3,547,214 A | | 12/1970 | Ravenel |
| 3,547,215 A | | 12/1970 | Bird |
| 3,889,527 A | | 6/1975 | Wallace |
| 3,921,999 A | | 11/1975 | Masser |
| 4,125,276 A | | 11/1978 | Levasseur |
| 4,166,640 A | | 9/1979 | Van Denberg |
| 4,273,357 A | | 6/1981 | Pashkow |
| 4,427,213 A | | 1/1984 | Raidel, Jr. |
| 4,566,719 A | | 1/1986 | Van Denberg |
| 4,632,422 A | * | 12/1986 | Csordas et al. ......... 280/124.106 |
| 4,655,467 A | * | 4/1987 | Kitzmiller et al. ............ 280/444 |
| 4,667,974 A | | 5/1987 | Giese |
| 5,002,305 A | | 3/1991 | Raidel |
| 5,037,126 A | | 8/1991 | Gottschalk et al. |
| 5,039,124 A | | 8/1991 | Widmer |

(Continued)

*Primary Examiner* — Ruth Ilan
*Assistant Examiner* — Barry Gooden, Jr.
(74) *Attorney, Agent, or Firm* — Price Heneveld LLP

(57) ABSTRACT

A suspension assembly includes a pair of frame brackets adapted to couple to a vehicle frame, an axle assembly, a torsional member having reliefs located proximate each end thereof, and a pair of trailing arms each operably coupled to the axle assembly, and pivotably coupled to one of the frame brackets by an associated bushing assembly, wherein each bushing assembly includes a pin member and a flexibly resilient bushing member extending about at least a portion of the pin member, and wherein the pin member of each bushing assembly extends into one of the reliefs of the torsional member, and wherein each pin member is secured to one of the frame brackets.

26 Claims, 7 Drawing Sheets

(56) References Cited

U.S. PATENT DOCUMENTS

| | | | |
|---|---|---|---|
| 5,083,812 A | 1/1992 | Wallace et al. | |
| 5,127,668 A | 7/1992 | Raidel | |
| 5,328,159 A | 7/1994 | Kaufman et al. | |
| 5,639,110 A | 6/1997 | Pierce et al. | |
| 5,649,719 A | 7/1997 | Wallace et al. | |
| 5,711,544 A | 1/1998 | Buhl | |
| 5,718,445 A | 2/1998 | VanDenberg | |
| 5,820,156 A | 10/1998 | VanDenberg | |
| 5,882,031 A | 3/1999 | VanDenberg | |
| 6,129,367 A | 10/2000 | Bublies et al. | |
| 6,241,266 B1 | 6/2001 | Smith et al. | |
| 6,276,710 B1 | 8/2001 | Sutton | |
| 6,290,244 B1 | 9/2001 | Hosoya | |
| 6,328,322 B1 | 12/2001 | Pierce | |
| 6,702,325 B1 | 3/2004 | Pierce | |
| 6,808,192 B1 | 10/2004 | Bol | |
| 6,827,193 B2 | 12/2004 | Conrad et al. | |
| 6,857,645 B2 | 2/2005 | Melton et al. | |
| 7,178,817 B1 | 2/2007 | Welles et al. | |
| 7,210,371 B2 | 5/2007 | Barnett | |
| 7,722,064 B2 | 5/2010 | Stuart et al. | |
| 8,424,890 B2 * | 4/2013 | Eismann et al. | 280/124.107 |
| 2001/0035624 A1 * | 11/2001 | Hickling | 280/124.169 |
| 2004/0007845 A1 | 1/2004 | Reineck | |
| 2004/0021290 A1 | 2/2004 | Hicks et al. | |
| 2005/0280239 A1 | 12/2005 | Johnson | |
| 2006/0017252 A1 | 1/2006 | Oki et al. | |
| 2006/0049600 A1 | 3/2006 | Dudding et al. | |
| 2006/0076750 A1 | 4/2006 | Sundgren et al. | |
| 2006/0255557 A1 | 11/2006 | Hass et al. | |
| 2007/0114746 A1 | 5/2007 | Tucker | |
| 2011/0254242 A1 * | 10/2011 | Eismann et al. | 280/124.106 |

* cited by examiner

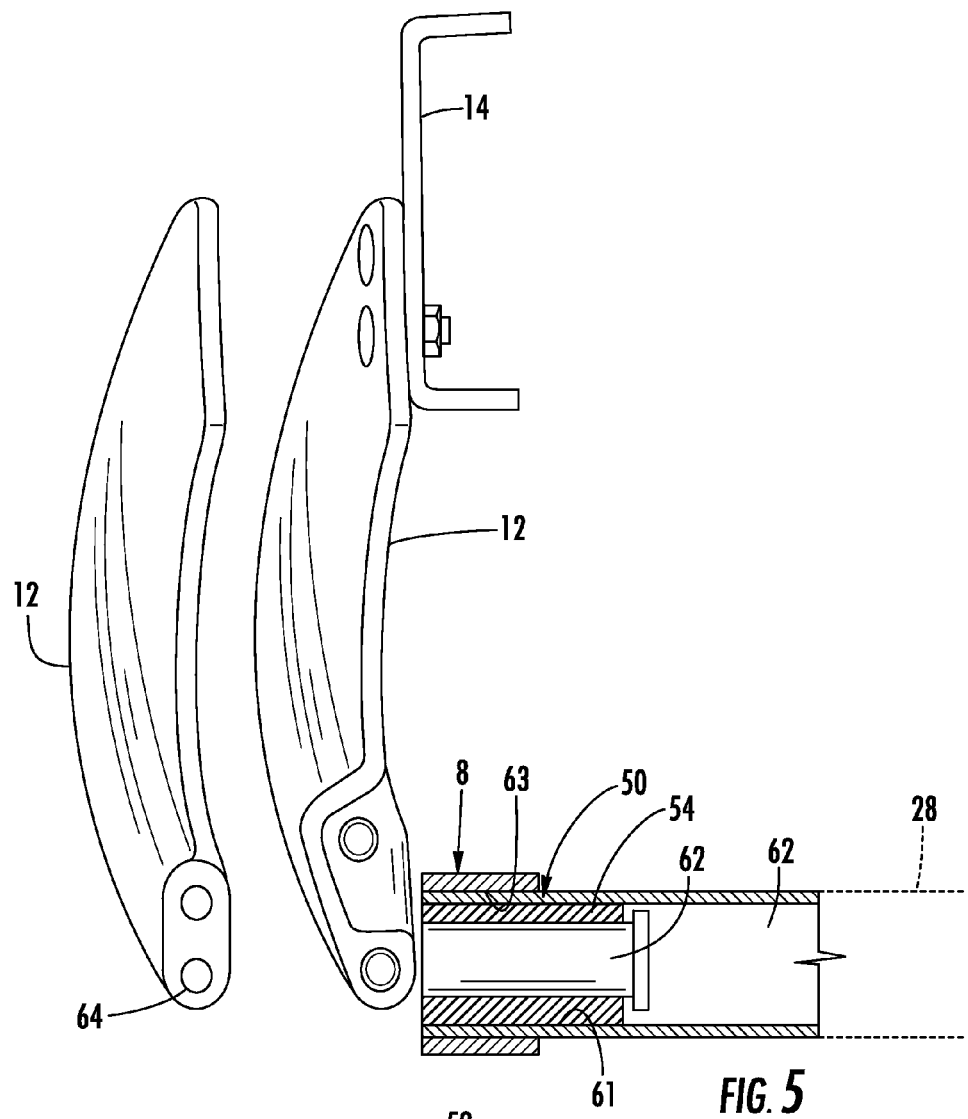
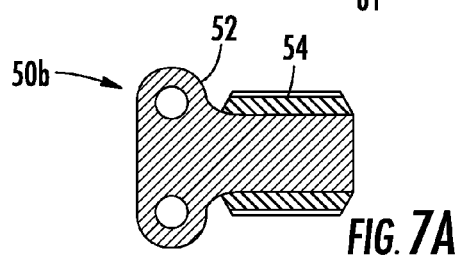
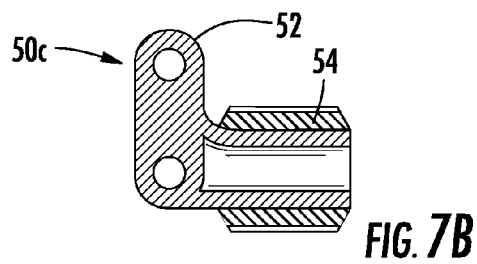

US 8,955,860 B2

VEHICLE SUSPENSION ASSEMBLY WITH INTEGRATED TORQUE MEMBER AND TRAILING ARM MOUNT

BACKGROUND OF THE INVENTION

The present invention relates to heavy duty vehicle suspensions and assemblies, and particularly to suspension assemblies incorporating a trailing arm-type configuration. More particularly, the present invention relates to a vehicle suspension assembly that includes an integrated torque member and trailing arm mount assembly.

Trailing arm-type suspension assemblies are used in a wide variety of applications, such as to support tractor trailers, busses, motor homes, and the like. These assemblies typically include a pair of trailing arms pivotally mounted to a vehicle frame at one end and supporting spring assemblies at an opposite end, with an associated axle extending between the trailing arms. By example, a prior art suspension assembly 30 is illustrated in FIG. 1, and includes a pair of frame brackets 32, a corresponding pair of trailing arms 34, an axle assembly 36 extending between the trailing arms 34, and a torque tube 38 also extending between the trailing arms 34. It is noted that the trailing arms 34 are pivotally coupled to the associated frame brackets 32 via a respective pair of bushing assemblies 40 located at a proximate end 42 of the trailing arms 34, and that the torque tube 38 is pivotally coupled to the trailing arms 34 at a position substantially offset from the proximate end 42 of each of the trailing arms 34.

BRIEF SUMMARY OF THE INVENTION

One aspect of the present invention is to provide a suspension assembly that comprises a first frame bracket and a second frame bracket each adapted to couple to a vehicle frame, an axle assembly, a torsional member having a first relief located proximate a first end and a second relief located proximate a second end, and first and second trailing arms operably coupled to the axle assembly. The first trailing arm is pivotally coupled to the first frame bracket by a first bushing assembly, wherein the first bushing assembly includes a first pivot member and a flexibly resilient first bushing member extending about at least a portion of the first pin member, and wherein the first pivot member of the first bushing assembly extends into the first relief of the first end of the torsional member and wherein the first pin member is secured to the first frame bracket. The second trailing arm is pivotally coupled to the second frame bracket by a second bushing assembly, wherein the second bushing assembly includes a second pin member and a flexibly resilient second bushing member extending about at least a portion of the second pin member, and wherein the second pin member of the second bushing assembly extends into the second relief of the second end of the torsional member, and wherein the second pin is secured to the second frame bracket.

The present inventive vehicle suspension assembly provides a durable, uncomplicated design that can be easily and quickly assembled, while simultaneously reducing manufacturing costs. The invention is efficient in use, economical to manufacture, capable of a long operating life, and is particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 5 is a partial cross-sectional end view of a trailing arm and a torsional member mounted to a frame bracket via the pin bushing assembly;

FIG. 7a is an end view of a T-shaped core member of the pin bushing assembly;

FIG. 7b is an end view of a L-shaped core member of the pin bushing assembly.

DETAILED DESCRIPTION

Figure 1:
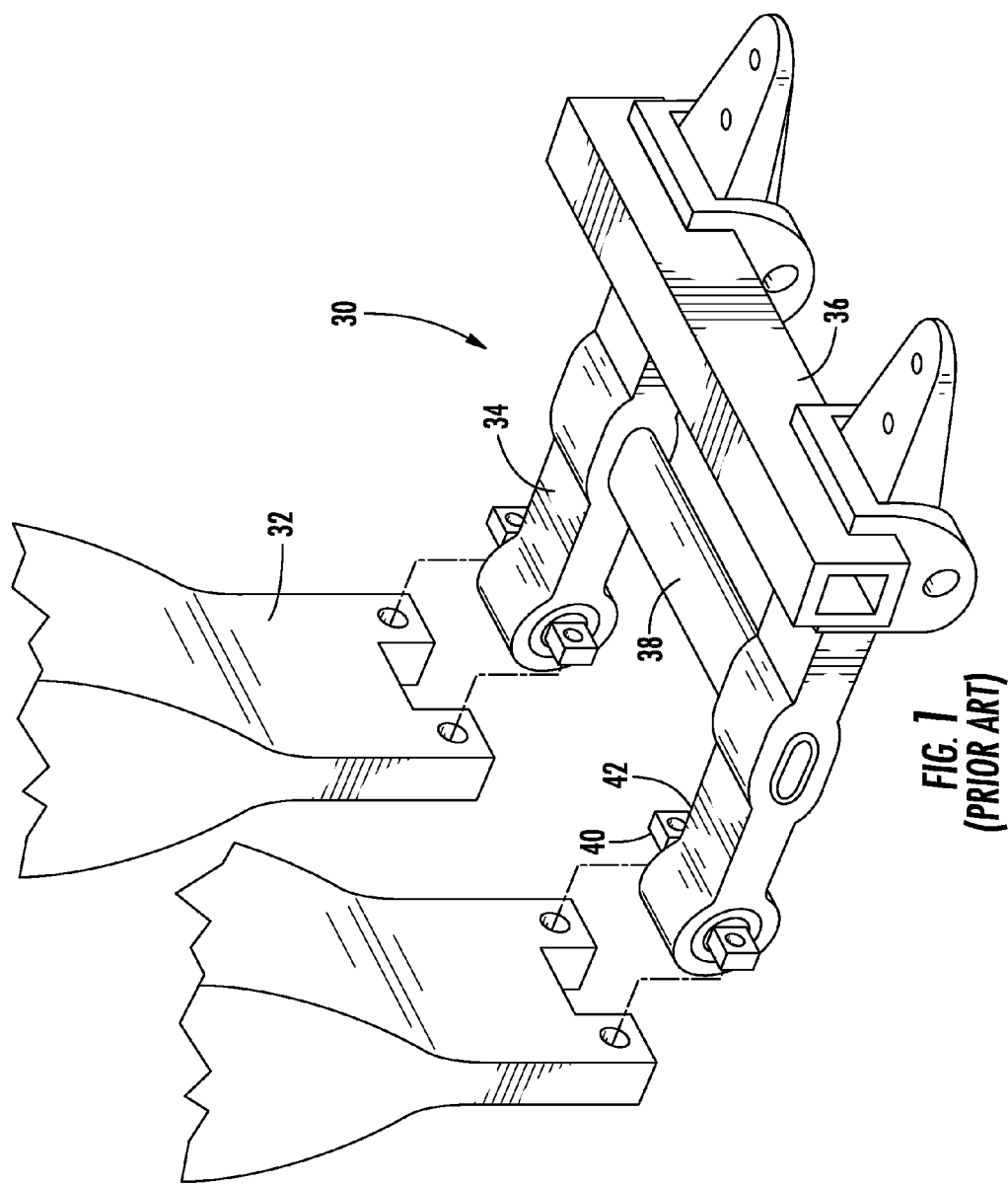
FIG. 1 is a perspective view of a prior art suspension assembly.
Figure 2:
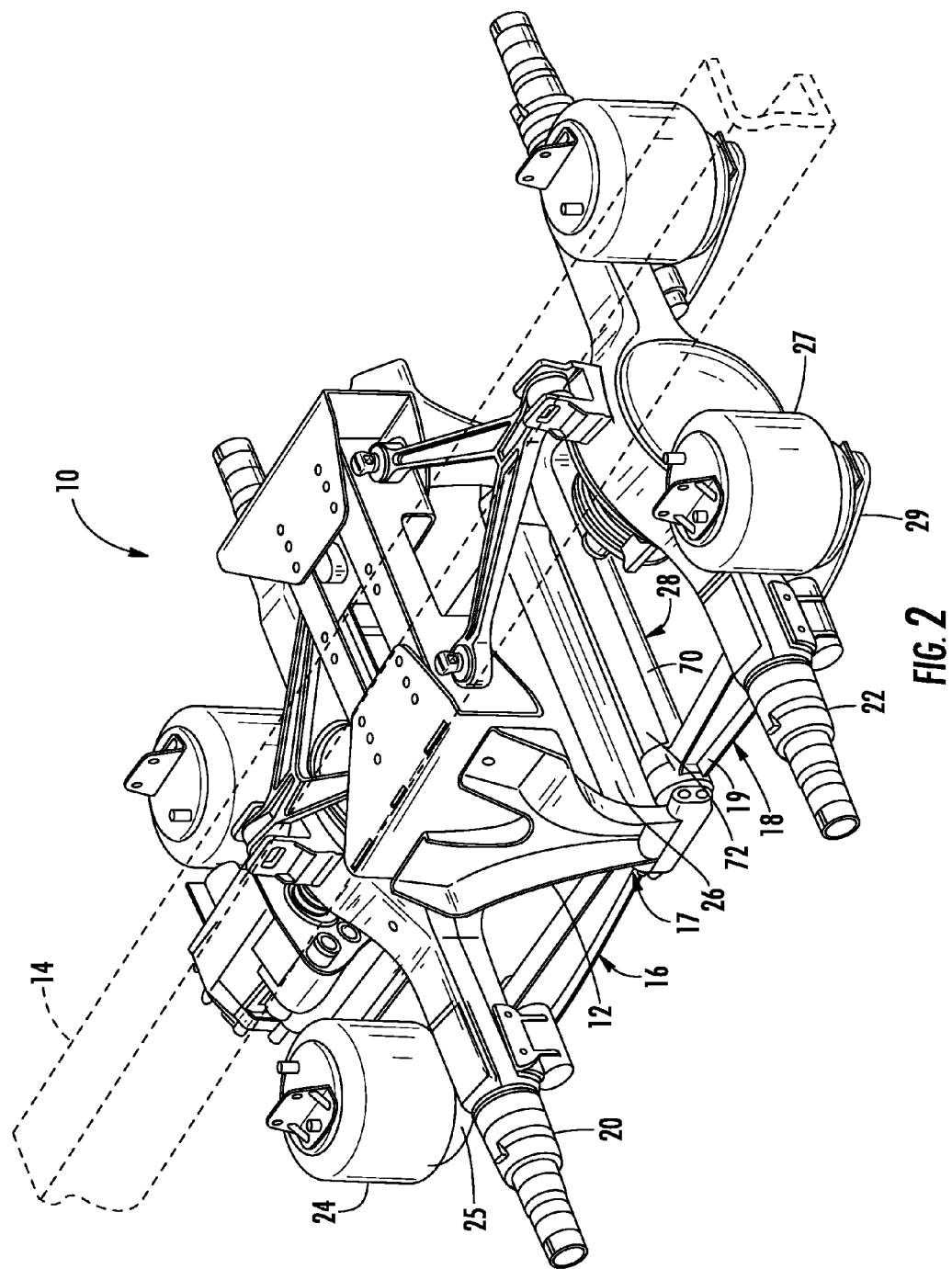
FIG. 2 is a perspective view of a suspension assembly embodying the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

A suspension assembly 10 (FIG. 2) comprises a pair of frame brackets 12 each extending downwardly from an associated vehicle frame member 14, a pair of forwardly extending trailing arms or beams 16 each pivotably coupled at a first end 17 to one of the frame brackets 12, a pair of rearwardly extending trailing arms or beams 18 each pivotably coupled at a first end 19 to one of the frame brackets 12, a forward axle assembly 20 coupled to the forwardly extending trailing arms 16 along the length thereof, a rearward axle assembly 22 coupled to the rearwardly extending trailing arms 18 along the length thereof, a pair of forward air springs 24 supported on the distal end 25 of the forwardly extending trailing arms 16 and extending between the forwardly extending trailing arms 16 and the frame member 14, a pair of rearward air springs 27 supported on the distal end 29 of the rearwardly extending trailing arms 18 and extending between the rearwardly extending trailing arms 18 and the frame member 18, and torque tubes or torsional members 26, 28 coupled with and extending between the pairings of the forwardly extending trailing arms 16 and the rearwardly extending trailing arms 18, respectively.

Figure 3:
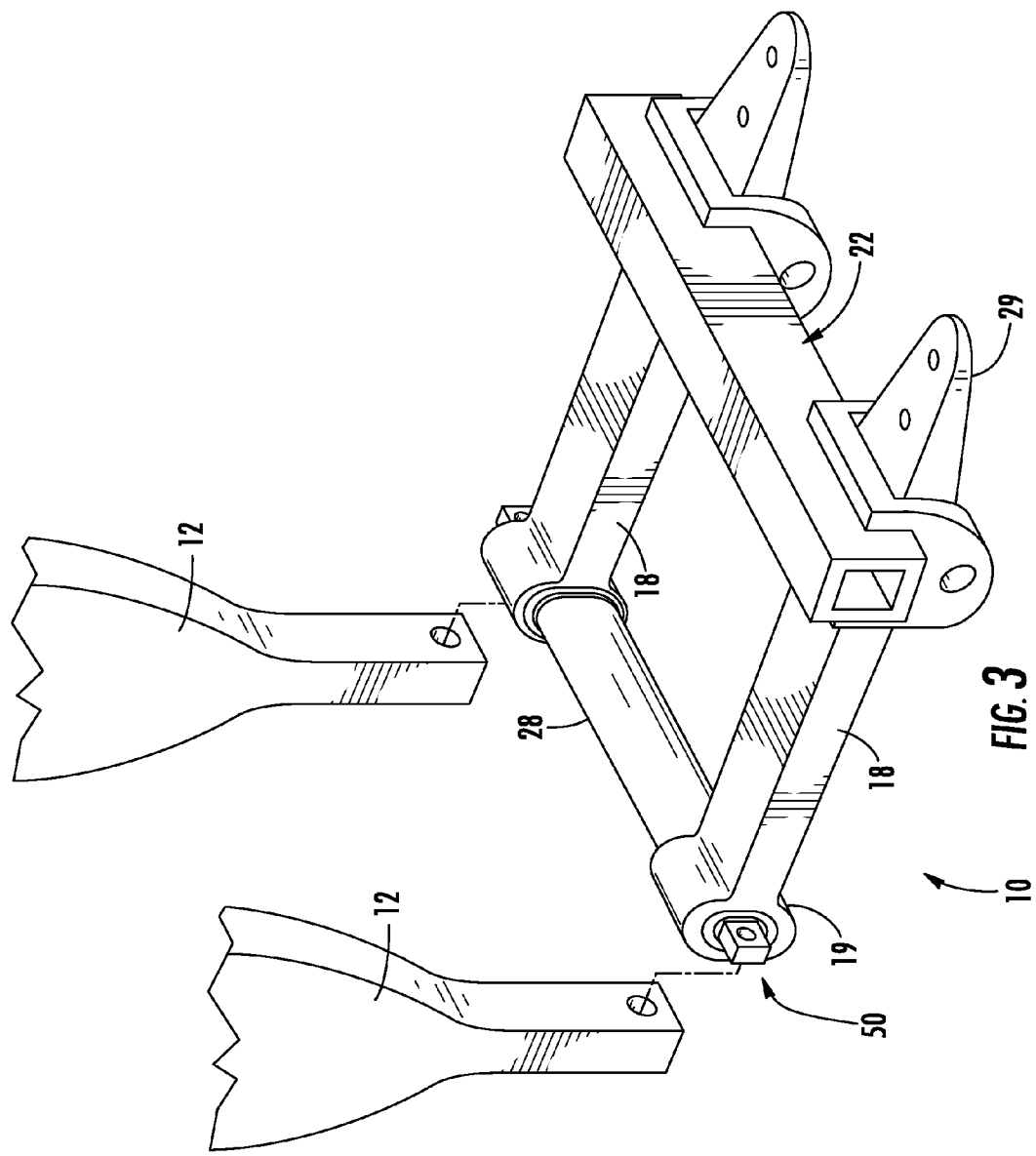
FIG. 3 is a perspective view of a portion of the suspension assembly.
Figure 4:
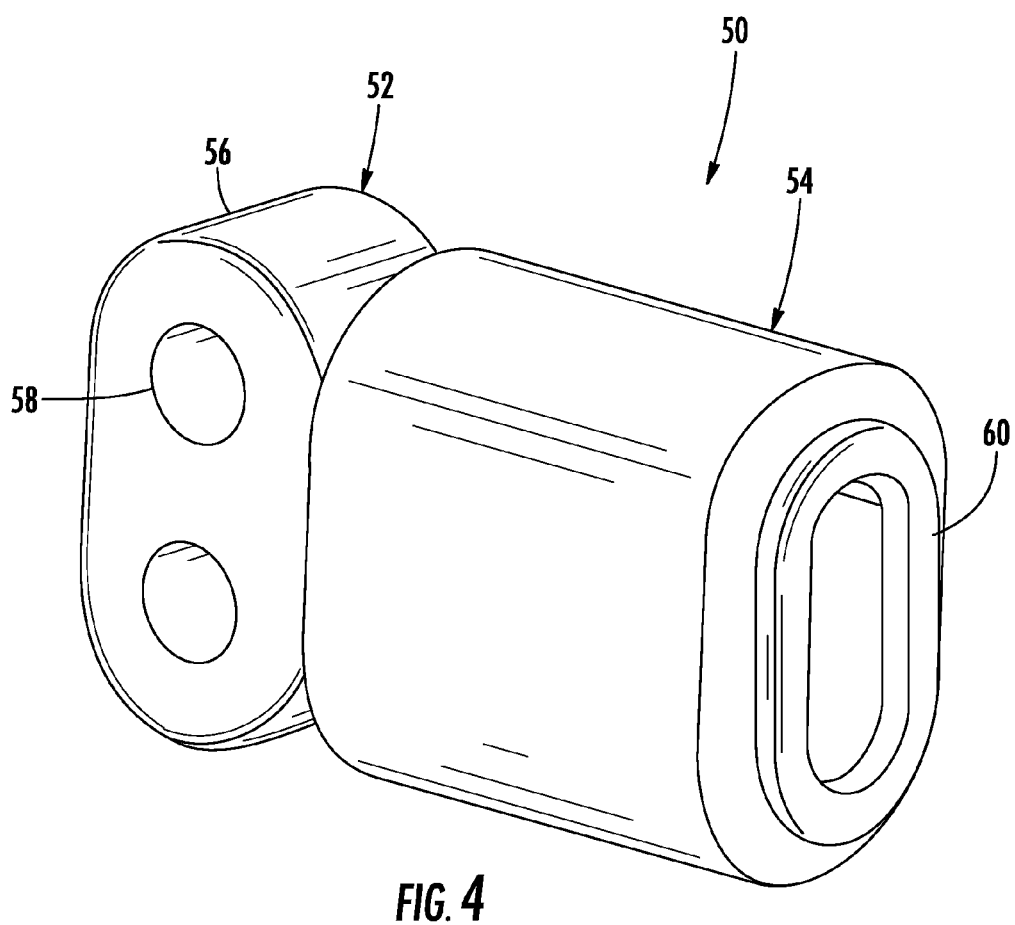
FIG. 4 is a perspective view of a pin bushing assembly.

As best illustrated in FIG. 3, the present inventive suspension assembly 10 includes the combination and co-locating of the pivoting connection of each of the trailing arms 16, 18 to the frame brackets 12, and the bushing assemblies via a pair of pin bushing assemblies 50. Each pin bushing assembly 50 (FIG. 4) includes a cast or forged single-piece core member or pin 52 and a rubber bushing member 54. In the illustrated example, the core member 52 includes a mounting portion 56 having a pair of mounting apertures 58 extending therethrough, and an extension portion 60 extending from the mounting portion 56 and about which the rubber bushing member 54 is bonded.

In assembly, and as best illustrated in FIG. 5, the extension portion 60 and bushing member 54 are received into a corresponding relief 61 defined by an end of a hollow interior 62 of the associated torque tube 28, while the torque tube 26 is frictionally secured within an aperture 63 of the trailing arm 18. The mounting portion 56 is secured to the associated frame bracket 12 via a plurality of mechanical fasteners (not shown) that are received into apertures 64 of the frame bracket 12 and the apertures 58 of the pin bushing assembly 50. The bushing assembly (not shown) associated with the opposite end of the torsional member 28 is similarly coupled to the torsional member 28 and corresponding frame bracket 12.

As best illustrated in FIG. 2, the torsional member 28 is provided a generally oval-shaped cross-sectional configuration having a pair of longitudinally-extending flat portions 70 interspaced with a pair of longitudinally-extending rounded portions 72. The extension portion 60 of each pin 52 as well as the bushing 54 are each preferably provided with a generally oval-shaped cross-sectional configuration that is complimentary to the cross-sectional configuration of the relief 61 of the interior 62. Likewise, the aperture 63 of the trailing arms 16, 18 are provided with a generally oval-shaped configuration that is complimentary to the cross-sectional configuration of the torsional member 28.

Figure 6A:
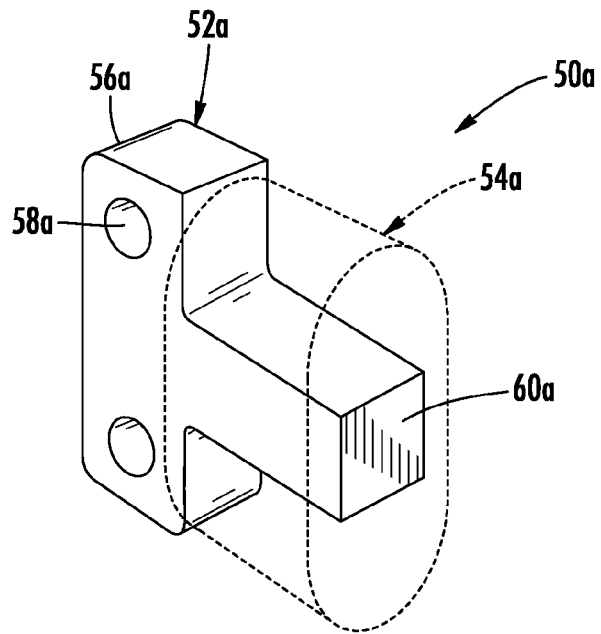
FIG. 6a is a perspective view of a first alternative embodiment of the bushing assembly.
Figure 6B:
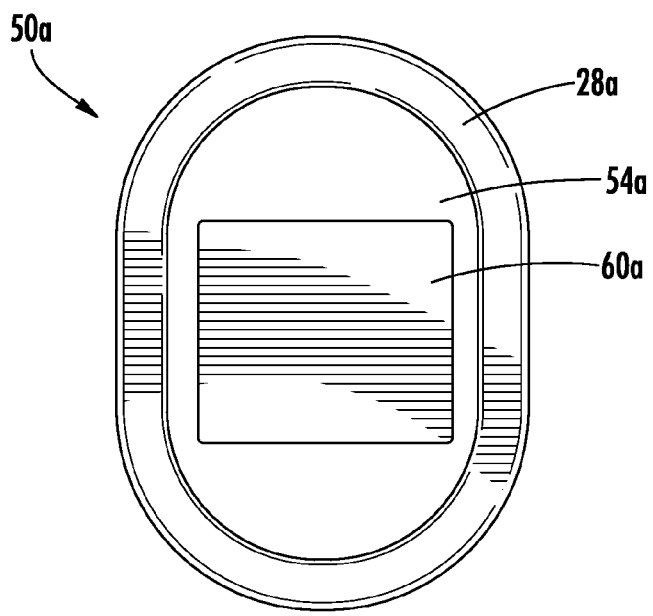
FIG. 6b is an end view of the first alternative embodiment of the bushing assembly.
Figure 8:
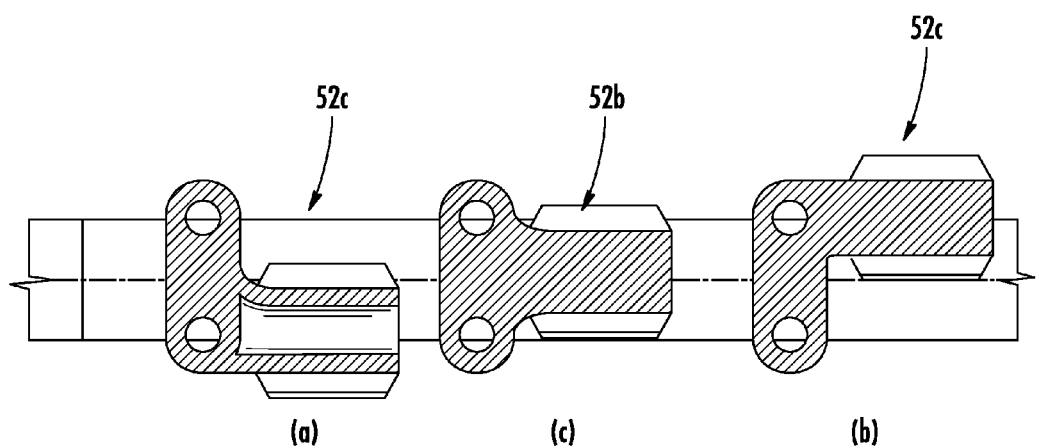
FIGS. 8a-8c are cross-sectional end views of the L-shaped core member and the T-shaped core member, with FIGS. 8a and 8b illustrating vertically reversed orientations of the L-shaped core member.

The reference numeral 50a (FIGS. 6a and 6b) generally designates another embodiment of the bushing assembly. Since the bushing assembly 50a is similar to the previously described bushing assembly 50, similar parts appearing in FIG. 4 and FIGS. 6a and 6b respectively are represented by the same corresponding reference numerals, except for the suffix "a" in the numerals of the latter. In the illustrated example, the bushing assembly 50a includes a T-shaped core member 52a having a mounting portion 56a and an extension portion 60a, and a bushing member 54a extending about the extension portion 60a. The extension portion 60a is provided a square-shaped cross-sectional configuration, while the bushing member 54a is provided with a square-shaped cross-sectional inner passage that receives the extension portion 60a, and an oval-shaped outer configuration that is received within an oval-shaped inner passage of the torque tube 28a, thereby resulting in a bushing member 54a having relatively thin vertical walls and relatively thick horizontal portions.

The pin bushing assembly 50 (FIGS. 7a, 7b and 8a-8c) may include core members 52 having various geometrical configurations. As illustrated, the core member 52 is provided with a T-shaped geometrical configuration 52b, a.k.a. a T-pin bushing, or an L-shaped configuration 52c, a.k.a. an L-pin bushing. The various configurations of the core member 52 allow the associated torque tubes 28 to be mounted at various heights with respect to the frame bracket 12. For example, the L-shaped core member 52c may be configured such that the mounting portion 56b is offset from the extension portion 60a such that when the core member 52c is vertically reversed with regards to the torsional member 28, the torsional member 28 is coupled to the frame brackets 12 at varying select vertical positions.

In the foregoing description, it would be readily appreciated by those skilled in the art that modifications may be made to the invention without departing from the concepts disclosed herein. Such modifications are to be considered as included in the following claims, unless these claims by their language expressly state otherwise.

The invention claimed is:

1. A suspension assembly, comprising:
a first frame bracket and a second frame bracket each adapted to couple to a vehicle frame;
an axle assembly;
a torsional member having a first relief located proximate a first end and a second relief located proximate a second end;
a first trailing arm operably coupled to the axle assembly, and pivotably coupled to the first frame bracket by a first bushing assembly, wherein the first bushing assembly includes a first pin member and a flexibly resilient first bushing member extending about at least a portion of the first pin member, and wherein the first pin member of the first bushing assembly extends into the first relief of the first end of the torsional member, and wherein the first pin member is secured to the first frame bracket; and
a second trailing arm operably coupled to the axle assembly, and pivotably coupled to the second frame bracket by a second bushing assembly, wherein the second bushing assembly includes a second pin member and a flexibly resilient second bushing member extending about at least a portion of the second pin member, and wherein the second pin member of the second bushing assembly extends into the second relief of the second end of the torsional member, and wherein the second pin member is secured to the second frame bracket; and
wherein the first and second pin members each include a substantially T-shaped cross-sectional configuration.

2. The suspension assembly of claim 1, wherein the portion of the first pin member about which the first bushing member extends is received within the first relief of the first end of the torsional member, and wherein the portion of the second pin member about which the second bushing member extends is received within the second relief of the second end of the torsional member.

3. The suspension assembly of claim 1, wherein the first trailing arm is pivotably coupled to the first frame bracket proximate an end of the first trailing arm, and wherein the second trailing arm is pivotably coupled to the second frame bracket proximate an end of the second trailing arm.

4. The suspension assembly of claim 1, wherein the first relief of the torsional member is substantially oval-shaped and a portion of the first bushing member received within the first relief has a complimentary shape to the first relief, and wherein the second relief of the torsional member is substantially oval-shaped and a portion of the second bushing member received within the second relief has a complimentary shape to the second relief.

5. The suspension assembly of claim 1, wherein the first relief of the torsional member is substantially oval-shaped and the portion of the first pin received within the first relief has a complimentary shape to the first relief, and wherein the second relief of the torsional member is substantially oval-shaped and the portion of the second pin received within the second relief has a complimentary shape to the second relief.

6. The suspension assembly of claim 1, wherein the torsional member includes a longitudinally extending channel that includes the first relief and the second relief.

7. The suspension assembly of claim 1, wherein the first and second reliefs of the torsional member are each substantially oval-shaped.

8. The suspension assembly of claim 7, wherein the first and the second reliefs of the torsional member each include longitudinally extending flat portions interspaced with longitudinally rounded portions.

9. A suspension assembly, comprising:
a first frame bracket and a second frame bracket each adapted to couple to a vehicle frame;
an axle assembly;
a torsional member having a first relief located proximate a first end and a second relief located proximate a second end;
a first trailing arm operably coupled to the axle assembly, and pivotably coupled to the first frame bracket by a first bushing assembly, wherein the first bushing assembly includes a first pin member and a flexibly resilient first bushing member extending about at least a portion of the first pin member, and wherein the first pin member of the first bushing assembly extends into the first relief of the first end of the torsional member, and wherein the first pin member is secured to the first frame bracket; and
a second trailing arm operably coupled to the axle assembly, and pivotably coupled to the second frame bracket by a second bushing assembly, wherein the second bushing assembly includes a second pin member and a flexibly resilient second bushing member extending about at least a portion of the second pin member, and wherein the second pin member of the second bushing assembly extends into the second relief of the second end of the torsional member, and wherein the second pin member is secured to the second frame bracket, and
wherein the first and second pin members each include a substantially L-shaped cross-sectional configuration.

10. The suspension assembly of claim 9, wherein the portion of the first pin member about which the first bushing member extends is received within the first relief of the first end of the torsional member, and wherein the portion of the second pin member about which the second bushing member extends is received within the second relief of the second end of the torsional member.

11. The suspension assembly of claim 9, wherein the first trailing arm is pivotably coupled to the first frame bracket proximate an end of the first trailing arm, and wherein the second trailing arm is pivotably coupled to the second frame bracket proximate an end of the second trailing arm.

12. The suspension assembly of claim 9, wherein the first relief of the torsional member is substantially oval-shaped and a portion of the first bushing member received within the first relief has a complimentary shape to the first relief, and wherein the second relief of the torsional member is substantially oval-shaped and a portion of the second bushing member received within the second relief has a complimentary shape to the second relief.

13. The suspension assembly of claim 9, wherein the first relief of the torsional member is substantially oval-shaped and the portion of the first pin received within the first relief has a complimentary shape to the first relief, and wherein the second relief of the torsional member is substantially oval-shaped and the portion of the second pin received within the second relief has a complimentary shape to the second relief.

14. The suspension assembly of claim 9, wherein the torsional member includes a longitudinally extending channel that includes the first relief and the second relief.

15. The suspension assembly of claim 9, wherein the first and the second pin members each include a mounting portion that is offset from a central axis of the portion of each of the pin members that is received with the reliefs of the torsional member, thereby allowing the torsional member to be coupled to the frame brackets at a plurality of select vertical positions.

16. The suspension assembly of claim 15, wherein the first and the second pin members may each be vertically reversed with respect to the torsional member.

17. The suspension assembly of claim 9, wherein the first and the second reliefs of the torsional member are each substantially oval-shaped.

18. The suspension assembly of claim 17, wherein the first and the second reliefs of the torsional member each include longitudinally extending flat portions interspaced with longitudinally rounded portions.

19. A suspension assembly, comprising:
a first frame bracket and a second frame bracket each adapted to couple to a vehicle frame;
an axle assembly;
a torsional member having a first relief located proximate a first end and a second relief located proximate a second end;
a first trailing arm operably coupled to the axle assembly, and pivotably coupled to the first frame bracket by a first bushing assembly, wherein the first bushing assembly includes a first pin member and a flexibly resilient first bushing member extending about at least a portion of the first pin member, and wherein the first pin member of the first bushing assembly extends into the first relief of the first end of the torsional member, and wherein the first pin member is secured to the first frame bracket; and
a second trailing arm operably coupled to the axle assembly, and pivotably coupled to the second frame bracket by a second bushing assembly, wherein the second bushing assembly includes a second pin member and a flexibly resilient second bushing member extending about at least a portion of the second pin member, and wherein the second pin member of the second bushing assembly extends into the second relief of the second end of the torsional member, and wherein the second pin member is secured to the second frame bracket; and
wherein the bushing member includes a substantially differing cross-sectional thickness.

20. The suspension assembly of claim 19, wherein the portion of the first pin member about which the first bushing member extends is received within the first relief of the first end of the torsional member, and wherein the portion of the second pin member about which the second bushing member extends is received within the second relief of the second end of the torsional member.

21. The suspension assembly of claim 19, wherein the first trailing arm is pivotably coupled to the first frame bracket proximate an end of the first trailing arm, and wherein the second trailing arm is pivotably coupled to the second frame bracket proximate an end of the second trailing arm.

22. The suspension assembly of claim 19, wherein the first relief of the torsional member is substantially oval-shaped and a portion of the first bushing member received within the first relief has a complimentary shape to the first relief, and wherein the second relief of the torsional member is substantially oval-shaped and a portion of the second bushing member received within the second relief has a complimentary shape to the second relief.

23. The suspension assembly of claim 19, wherein the first relief of the torsional member is substantially oval-shaped and the portion of the first pin received within the first relief has a complimentary shape to the first relief, and wherein the second relief of the torsional member is substantially oval-shaped and the portion of the second pin received within the second relief has a complimentary shape to the second relief.

24. The suspension assembly of claim 19, wherein the torsional member includes a longitudinally extending channel that includes the first relief and the second relief.

25. The suspension assembly of claim 19, wherein the first and the second reliefs of the torsional member are each substantially oval-shaped.

26. The suspension assembly of claim 25, wherein the first and the second reliefs of the torsional member each include longitudinally extending flat portions interspaced with longitudinally rounded portions.

* * * * *